No. 894,129. PATENTED JULY 21, 1908.
H. H. FOX.
BRAKE.
APPLICATION FILED NOV. 26, 1907.
2 SHEETS—SHEET 1.
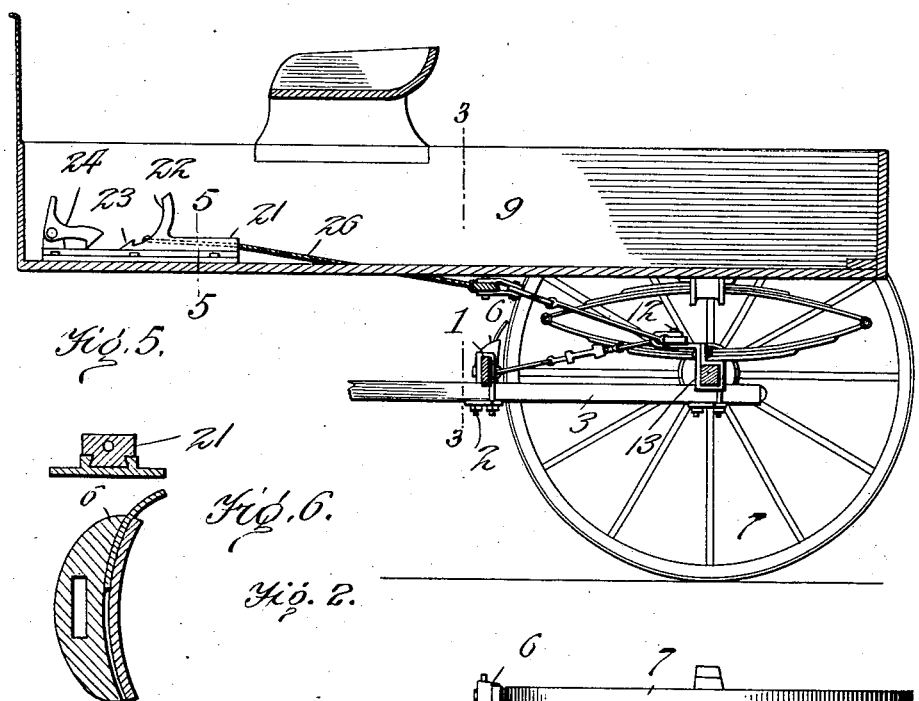
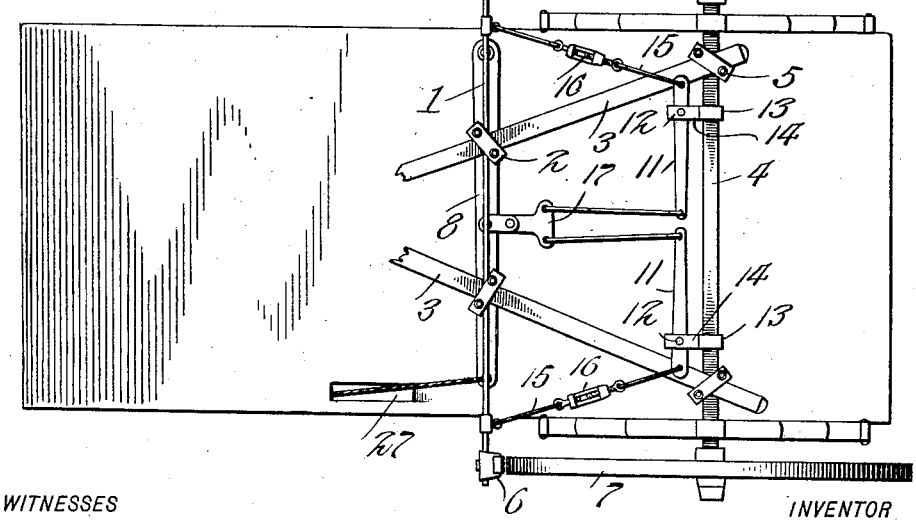
WITNESSES
INVENTOR
Herbert H. Fox
BY
ATTORNEYS No. 894,129.
PATENTED JULY 21, 1908.
H. H. FOX.
BRAKE.
APPLICATION FILED NOV. 26, 1907.
2 SHEETS—SHEET 2.
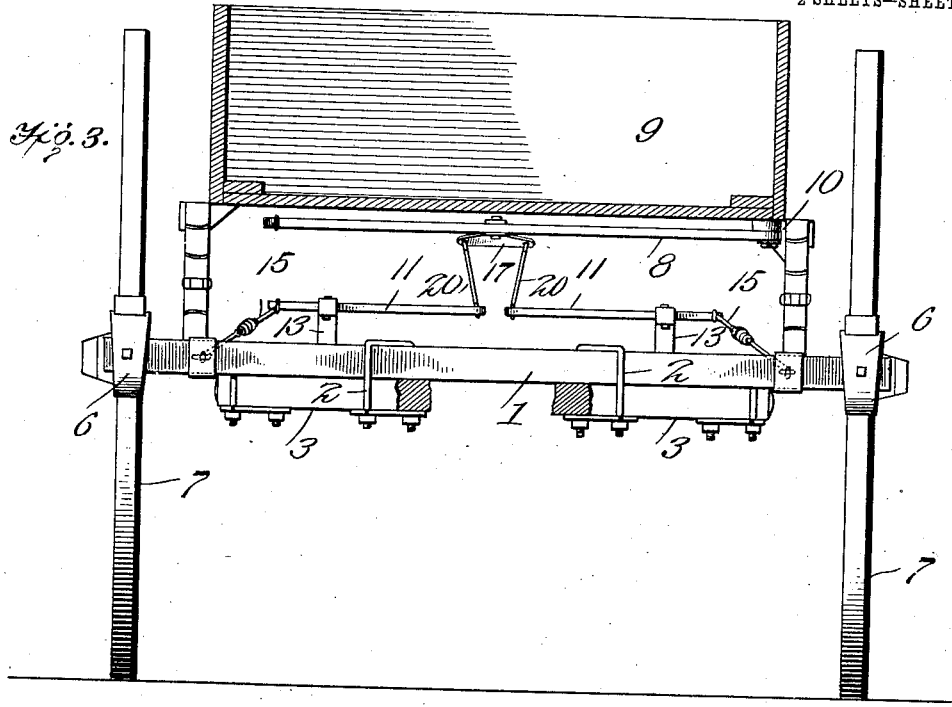
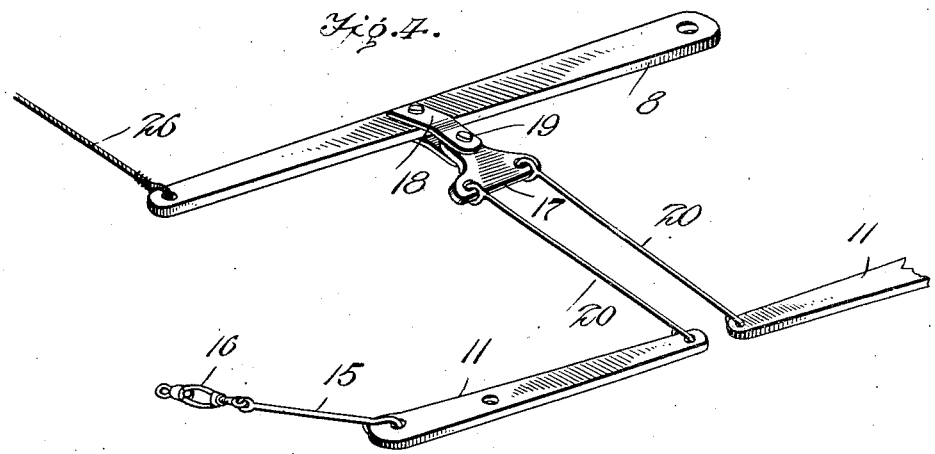
WITNESSES
L. H. Schmidt
J. W. Garner
INVENTOR
Herbert H. Fox,
BY Victor J. Evans
ATTORNEY

UNITED STATES PATENT OFFICE.

HERBERT H. FOX, OF CASSADAGA, NEW YORK.

BRAKE.

No. 894,129.

Specification of Letters Patent.

Patented July 21, 1908.

Application filed November 26, 1907. Serial No. 403,928.

*To all whom it may concern:*

Be it known that I, HERBERT H. FOX, a citizen of the United States, residing at Cassadaga, in the county of Chautauqua and State of New York, have invented new and useful Improvements in Brakes, of which the following is a specification.

This invention relates to improvements in vehicle brakes, and consists in the construction, combination and arrangement of devices hereinafter described and claimed.

One object of my invention is to provide a spring-acting brake beam element which carries the brake shoes and serves to normally keep them out of engagement with the wheels.

A further object is to combine with the spring-acting brake shoe carrying element improved means to operate the same to apply the brake shoes to the wheels.

A further object is to effect improvements in the construction of the brake shoes to prevent mud from clogging on the wheels and between them and the brake shoes.

In the accompanying drawings, Figure 1 is a vertical longitudinal sectional view of a portion of a vehicle provided with my improved brake apparatus. Fig. 2 is a bottom plan view of the same. Fig. 3 is a vertical transverse sectional view of the same taken on the plane indicated by the line 3—3 of Fig 1. Fig. 4 is a detail perspective view of the primary lever, the secondary levers and their connections. Fig. 5 is a detail transverse sectional view taken on the plane indicated by the line 5—5 of Fig. 1. Fig. 6 is a detail sectional view of one of the brake shoes.

In accordance with my invention, I provide a spring-acting brake beam 1 which is fixed and supported by any suitable means or in any suitable manner and is here shown as secured by clips 2 on the reach bars 3, the rear portions of which are secured to the under side of the rear axle 4 by clips 5. The spring-acting brake beam is normally straight and normally keeps the brake shoes 6, which are attached to the ends thereof, out of contact with and a slight distance from the wheels 7. Each shoe has a curve spring plate 6ª at its upper side to bear against and scrape the wheel when the shoe is applied. I would have it understood that the spring-acting brake beam may be mounted by any suitable means and I do not desire to limit myself in this particular.

A primary lever 8 is suitably mounted, and is here shown as disposed transversely under the vehicle box or bed 9 and is pivotally connected at one end thereto, as at 10. A pair of secondary brake levers 11 are also suitably mounted. They are here shown as fulcrumed as at 12 to clips 13 which are secured on the axle 4 and are provided with bracket arms 14. The shorter ends of the said secondary levers are connected by links 15 to the spring-acting brake beam at points near the ends thereof and each of the said links includes an adjusting device for varying its length, such adjusting devices being here shown as turn-buckles 16. An equalizing link device 17, which is here shown as substantially triangular in form, is connected at its front end to the primary brake lever 8 by means of a pair of link plates 18 which are bolted on the upper and lower sides of said lever 8 and between which the said equalizing link device is pivoted, as at 19. The inner longer arms of the secondary brake levers 11 are connected to the said equalizing link device near the rear corners of the latter by link rods 20 or other suitable connections.

When the spring-acting brake beam is straight, with the brake shoes released from the wheels 7, the primary and secondary brake levers are parallel or substantially so, and are disposed at right angles to the vehicle bed or body as shown in Fig. 2. It will be understood that by moving the front end of the primary brake lever forwardly so as to cause the inner ends of the secondary brake levers to be also moved forwardly, the outer ends of said secondary brake levers will move rearwardly and being connected to the outer portions of the spring-acting brake beam by the means hereinbefore described will cause the ends of such spring-acting brake beam to be moved rearwardly so as to apply the brake shoes to the wheels. The tendency of the spring-acting brake beam to dispose itself in a right line causes the same as soon as the levers cease to operate to move the brake shoes out of contact with the wheel.

Within the scope of my invention any means, broadly, may be employed to operate the primary brake lever, but I have here shown the preferred brake lever operating means which I will now describe.

A slide 21 is mounted for longitudinal movement on the upper side of the bottom of the box or body near one side and near the front end thereof and is provided with an upwardly extending arm 22 to enable the driver by the use of one foot to readily move said slide forwardly. Any suitable means may be employed to mount the slide so that the latter may be moved longitudinally and I do not limit myself in this particular. The said slide is provided at its front end with a ratchet tooth 23. At a suitable distance in advance of the slide is a toothed gravity acting pivotally mounted stop 24, here shown as pivoted on an upwardly extending lug 25. When the slide 21 has been moved forward the said stop 24 engages the tooth 23 of said slide and locks the latter in such position. Said slide is connected by a suitable cord, chain, rod or other connecting element 26 to the lever 8 and passes through an inclined opening indicated at 27 in the bottom of the vehicle bed or body.

It will be understood from the foregoing that the said lever 8 may be operated to apply the brakes by moving the slide 21 forwardly and that the stop 24 serves to lock said slide in such position so as to keep the brake shoes applied to the wheels until the stop is disengaged from the slide.

Having thus described the invention, what I claim as new is:—

A brake apparatus of the class described comprising a spring bar having brake shoes at its ends, said spring bar having its central portion fixed and its end portions free to enable such end portions by their own spring action to hold the brake shoes in disengaged position, a primary lever, an equalizing device pivotally connected thereto and extending rearwardly therefrom, a pair of secondary levers, connecting devices attached to the secondary levers and also to the equalizing device at the rear corners of the latter at a point in rear of the pivotal connection between said equalizing device and the primary lever and means connecting said secondary lever to the spring acting brake bar at points near the ends thereof.

In testimony whereof I affix my signature in presence of two witnesses.

HERBERT H. FOX.

Witnesses:
 EMRY P. CRANDALL,
 HERMAN S. GRISWOLD.